United States Patent
Seznec-Serpaggi

(10) Patent No.: US 11,187,497 B2
(45) Date of Patent: Nov. 30, 2021

(54) SIGHT FOR USE BY DAY AND AT NIGHT AND FIREARM

(71) Applicants: H.T CONSULTANT, Luxembourg (LU); SOFTBOX MADEIRA UNIPESSOAL, LDA, Funchal (PT); GAL S.L. LTD, Herzeliya (IL)

(72) Inventor: Francis Seznec-Serpaggi, Piana (FR)

(73) Assignees: H.T CONSULTANT, Luxembourg (LU); SOFTBOX MADEIRA UNIPESSOAL, LDA, Funchal (PT); GAL S.L. LTD, Herzeliya (IL)

( * ) Notice: Subject to any disclaimer, the term of this patent is extended or adjusted under 35 U.S.C. 154(b) by 0 days.

(21) Appl. No.: 16/622,254

(22) PCT Filed: Jun. 13, 2018

(86) PCT No.: PCT/EP2018/065701
§ 371 (c)(1),
(2) Date: Dec. 12, 2019

(87) PCT Pub. No.: WO2018/229149
PCT Pub. Date: Dec. 20, 2018

(65) Prior Publication Data
US 2020/0103203 A1    Apr. 2, 2020

(30) Foreign Application Priority Data
Jun. 13, 2017 (FR) ...................... 1770622

(51) Int. Cl.
*F41G 1/32* (2006.01)
*G02B 27/01* (2006.01)
*F41G 3/16* (2006.01)

(52) U.S. Cl.
CPC ............... *F41G 3/16* (2013.01); *F41G 1/32* (2013.01); *G02B 27/0189* (2013.01)

(58) Field of Classification Search
CPC ............................. F41G 1/32; G02B 27/0189
See application file for complete search history.

(56) References Cited

U.S. PATENT DOCUMENTS 9,069,172 B1 * 6/2015 Morley .................. G02B 23/12
9,285,189 B1 * 3/2016 Zhang ....................... F41G 3/06
(Continued)

FOREIGN PATENT DOCUMENTS

EP    2416201 A2    2/2012
FR    2699658 A1 *  6/1994  ............... F41G 3/12
(Continued)

OTHER PUBLICATIONS

International Search Report for International Application No. PCT/EP2018/065701, dated Jul. 6, 2018, 5 pages (including English translation).
(Continued)

*Primary Examiner* — Gabriel J. Klein
(74) *Attorney, Agent, or Firm* — TraskBritt

(57) ABSTRACT

This disclosure relates to a sight intended to be used by day and at night, the sight comprising:—an interface for attachment to a firearm,—a camera capturing part of the environment for sighting a target,—a sensor for measuring the illumination of the environment of the sight,—a screen for displaying the part of the environment captured by the camera, the screen having a luminosity, and—a controller capable of controlling the luminosity of the screen depending on the measured illumination, the camera and the screen being configured so that a user of the viewer sights a target with both eyes open.

11 Claims, 3 Drawing Sheets

(56) References Cited

U.S. PATENT DOCUMENTS

| | | | | |
|---|---|---|---|---|
| 10,054,397 B1* | 8/2018 | Reimer | | F41G 1/473 |
| 2011/0272580 A1* | 11/2011 | Houde-Walter | | F41G 1/35 |
| | | | | 250/338.3 |
| 2012/0033195 A1* | 2/2012 | Tai | | F41G 3/165 |
| | | | | 356/4.01 |
| 2012/0097741 A1* | 4/2012 | Karcher | | F41G 3/142 |
| | | | | 235/404 |
| 2012/0106170 A1* | 5/2012 | Matthews | | F41G 1/30 |
| | | | | 362/311.06 |
| 2012/0327247 A1* | 12/2012 | Mironichev | | F41G 3/165 |
| | | | | 348/164 |
| 2014/0226214 A1* | 8/2014 | Edwards | | G02B 27/017 |
| | | | | 359/630 |
| 2015/0253643 A1* | 9/2015 | Rickard | | G02B 27/02 |
| | | | | 359/275 |
| 2016/0028970 A1* | 1/2016 | Masarik | | G02B 26/0816 |
| | | | | 348/341 |
| 2016/0061549 A1* | 3/2016 | Patterson | | F41G 1/38 |
| | | | | 42/69.01 |
| 2016/0061567 A1* | 3/2016 | Regan | | G02B 23/10 |
| | | | | 42/119 |
| 2018/0188004 A1* | 7/2018 | Zhang | | H04N 5/33 |
| 2018/0204364 A1* | 7/2018 | Hoffman | | G09G 5/377 |
| 2019/0129162 A1* | 5/2019 | Hodelin | | G02B 23/2407 |
| 2020/0041890 A1* | 2/2020 | Peel | | G03B 29/00 |
| 2020/0049455 A1* | 2/2020 | Hamilton | | F41G 1/38 |

FOREIGN PATENT DOCUMENTS

| | | | | |
|---|---|---|---|---|
| GB | 2119125 A | * | 11/1983 | ............ F41G 3/22 |
| WO | 2007/030098 A1 | | 3/2007 | |
| WO | WO-2014024188 A1 | * | 2/2014 | ............ G02B 27/01 |

OTHER PUBLICATIONS

International Written Opinion for International Application No. PCT/EP2018/065701, dated Jul. 6, 2018, 7 pages (including English translation).

French Preliminary Search Report and Written Opinion for French Application No. 1770622, dated Mar. 29, 2018, 13 pages with English Translation.

* cited by examiner

SIGHT FOR USE BY DAY AND AT NIGHT AND FIREARM

CROSS-REFERENCE TO RELATED APPLICATIONS

This application is a national phase entry under 35 U.S.C. § 371 of International Patent Application PCT/EP2018/065701, filed Jun. 13, 2018, designating the United States of America and published in French as International Patent Publication WO 2018/229149 A1 on Dec. 20, 2018, which claims the benefit under Article 8 of the Patent Cooperation Treaty to French Patent Application Serial No. 1770622, filed Jun. 13, 2017.

TECHNICAL FIELD

The present disclosure relates to a sight for use by day and night. The present disclosure also relates to a weapon comprising such a sight.

BACKGROUND

In the military field, urban combat is a specific type of combat. In particular, in urban combat, the military wants to be able to simultaneously fire and move. In order to fire, the military needs to perceive its environment and be able to stay under cover. In addition, the weapon used by the military should be compact and lightweight.

For this, it is known to use sights known as "red dot" sights. Such sights are direct view optical systems projecting into the user's field of view a red dot forming the targeted point. Sighting is performed with both eyes open and makes it possible to acquire a target quickly by day.

However, such sights are only usable by day since the acquisition speed is not fast enough for night use.

There is therefore a need for a sight allowing day and night use, notably by increasing the speed of acquiring a target.

BRIEF SUMMARY

For this, the present description will notably focus on a sight intended to be used by day and night, the sight comprising an attachment interface for attachment to a firearm, a camera acquiring a part of the environment for sighting a target, a measuring sensor for measuring the illumination of the environment of the sight and a screen for displaying the part of the environment acquired by the camera. The screen has a brightness. The sight also comprises a controller suitable for controlling the brightness of the screen according to the measured illumination.

According to particular embodiments, the sight comprises one or more of the following features, taken in isolation or according to all the technically possible combinations:

The camera and the screen are configured so that a user of the sight sights a target with both eyes open.

The screen has a diagonal the dimension of which is between 4 centimeters and 6 centimeters.

The controller is capable of displaying a sight reticle on the screen and is suitable for controlling the contrast between the sight reticle and the screen according to the measured illumination.

The camera has a magnification between 0.95 and 1.05.

The sight comprises a control button determining the operating mode of the camera, a first operating mode wherein the magnification of the camera is between 0.95 and 1.05 and a second operating mode wherein the magnification of the camera is between 1.95 and 2.05.

The camera comprises an image sensor, the measuring sensor being the image sensor.

The screen is adjustable between at least two distinct positions.

The sight comprises a direct optical view, switching between the screen view and the direct optical view being controlled by the controller according to the measured illumination.

The present description also describes a firearm provided with a sight as previously described.

According to a particular embodiment, the firearm comprises a support for the user's head, the support being arranged so that the distance between the operator's head and the screen is between 8 centimeters and 15 centimeters when the user's head is resting on the support.

BRIEF DESCRIPTION OF THE DRAWINGS

Other features and advantages of embodiments of the present disclosure will appear upon reading the following description, of embodiments of the present disclosure, given by way of example only and with reference to the drawings, which are.

DETAILED DESCRIPTION

Figure 1:
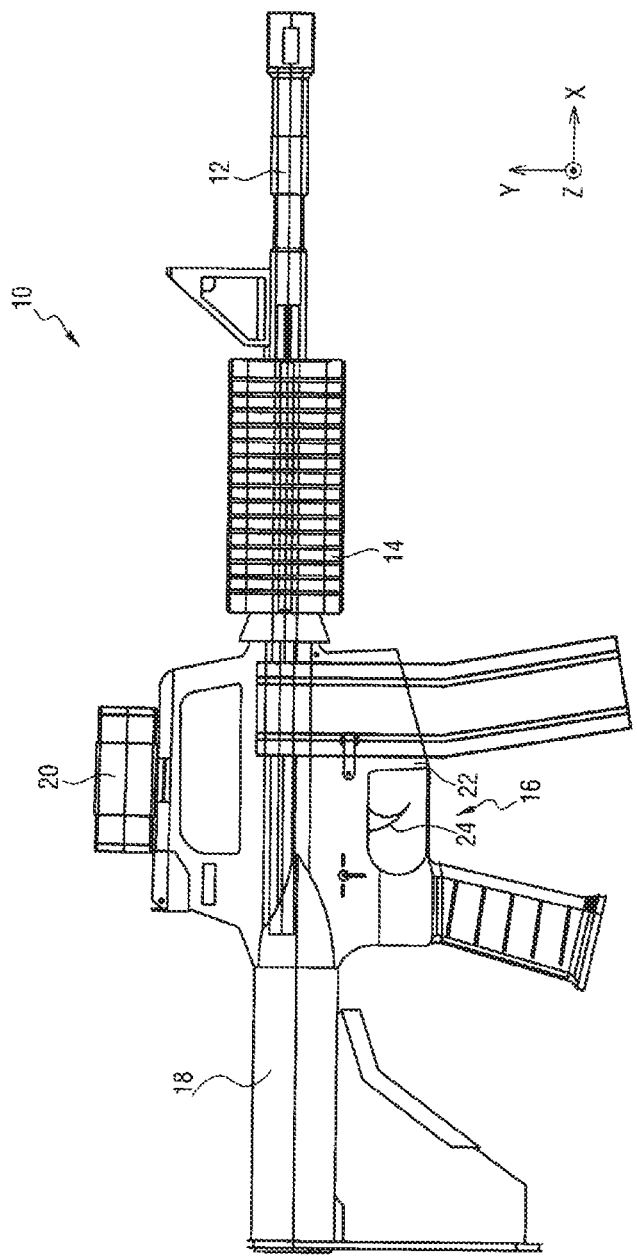
FIG. 1, a schematic view of an example of a firearm comprising a sight.

A firearm 10 is represented in FIG. 1.

The firearm 10 is a weapon that is used to aim and to fire at a target in a user's line of sight.

The firearm 10 is suitable for urban combat.

The firearm 10 is portable.

According to the example described, the firearm 10 is an assault rifle.

As a variant, the firearm 10 is a hunting rifle, a carbine, a revolver, a machine gun or a less lethal weapon such as a riot gun.

The firearm 10 notably comprises a barrel 12, a stock 14, a firing device 16, a support 18 for the user's head and a sight 20.

The firearm 10 also comprises other elements that are not described more precisely hereinafter, such as a magazine, or that are not represented, such as a pin, a flash suppressor, or a cocking lever.

The barrel 12 is a cylinder with a circular base having a diameter suitable for allowing the passage of small caliber ammunition.

The barrel 12 extends along a main direction. The main direction is symbolized by an X axis in FIG. 1. The main direction is therefore denoted by "main direction X" subsequently.

A first transverse direction is also defined, the first transverse direction being perpendicular to the main direction. The first transverse direction is symbolized by a Y axis in FIG. 1. The first transverse direction is therefore denoted by "first transverse direction Y" subsequently.

A second transverse direction is also defined, the second transverse direction being perpendicular to the main direction X and to the first transverse direction Y. The second transverse direction is symbolized by a Z axis in FIG. 1. The second transverse direction is therefore denoted by "second transverse direction Z" subsequently.

The stock 14 is capable of supporting the barrel 12 and being held on the user's shoulder.

The firing device 16 is capable of launching ammunition.

According to the example represented, the firing device 16 comprises a trigger guard 22 and a trigger 24.

In other examples, the firing device 16 also comprises a safety.

The support 18 for the user's head corresponds to the heel of the stock 14. The support 18 is capable of allowing a quick positioning of the user's head and always in the same place.

The sight 20 enables the user to sight a target.

The sight 20 is also designated by the term "sighting device."

Figure 2:
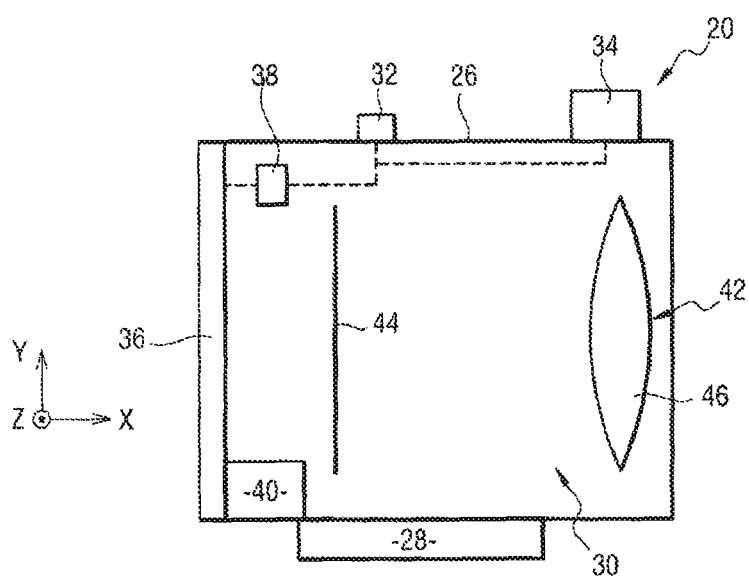
FIG. 2, a schematic representation of the sight in FIG. 1.

The sight 20 can be seen in more detail in FIG. 2.

The sight 20 is intended to be used by day and by night.

The sight 20 is capable of operating at an operating temperature and of being stored at a storage temperature.

This means that each component of the sight 20 is capable of operating at the operating temperature and of being stored at the storage temperature.

According to the example described, the operating temperature is between −10° and 40°. The term "between" is understood in its broad meaning. In other words, a quantity is between a first value and a second value means that the quantity is greater than or equal to the first value and that the quantity is less than or equal to the second value.

In the case described, the storage temperature is between −50° and 60°.

The sight 20 has a weight strictly less than 500 grams.

The sight 20 comprises a protective shell 26 intended to protect all the components of the sight 20.

For example, the protective shell 26 is in the form of a wall in a first material.

The first material is, for example, plastic, aluminum or a composite material.

The protective shell 26 has a dimension along the main direction X referred to as length in the rest of the description.

The length of the protective shell 26 is between 50 millimeters (mm) and 300 mm.

According to the example described, the length is equal to 150 mm.

The protective shell 26 also has a dimension along the first transverse direction Y referred to as height in the rest of the description.

The height is between 50 mm and 70 mm.

According to the example described, the height is equal to 70 mm.

The protective shell 26 also has a dimension along the second transverse direction Z referred to as depth in the rest of the description.

The depth is between 30 mm and 50 mm.

According to the example described, the depth is equal to 50 mm.

The protective shell 26 comprises, in the case described, an attachment interface 28.

The attachment interface 28 is an interface for attaching the sight 20 to the firearm 10.

For example, the attachment interface 28 is a Picatiny interface.

As a variant, the attachment interface 28 is a set of screws capable of engaging with corresponding orifices in the stock 14.

The sight 20 comprises a camera 30, a control button 32, a sensor 34, a screen 36, a controller 38 and a power supply 40.

The camera 30 is capable of acquiring a part of the environment for sighting a target.

The camera 30 comprises an optical system 42 and an image sensor 44.

The optical system 42 serves to capture a part of the environment of the sight 20 and to send the captured image to the image sensor 44.

The optical system 42 has a large field of observation. A field of observation is termed "large" when the field is greater than or equal to 40%.

According to the example described, the field provided by the optical system 42 is equal to 50°. The field mentioned in this context is the total field of the optical system 42.

The optical system 42 comprises a single lens.

According to the present example, the optical system 42 comprises a lens serving as an eyepiece 46.

As a variant, the optical system 42 is more complex.

For example, the optical system 42 comprises two lenses or more than two lenses.

It is also conceivable to use lenses the focal length of which is variable, notably with the aid of mechanical rings.

The optical system 42 is provided with a digital magnifier that can be activated by the user.

The term "digital magnifier" is understood to mean a magnification of the image displayed on the screen 36 without any change in the observation of the image by the image sensor 44.

Two positions, or more precisely two operating modes, thus exist for the optical system 42, a first position wherein the digital magnifier is deactivated and a second position wherein the digital magnifier is activated.

In the first position, which is represented in FIG. 2, the magnification G of the optical system 42, i.e., the magnification of the camera 30, has a first value G1.

In the second position, the magnification G of the optical system 42, i.e., the magnification of the camera 30, has a second value G2.

The ratio between the second value G2 and the first value G1 is strictly greater than 1, so that the second position corresponds to a magnifier position.

According to one embodiment, the ratio between the second value G2 and the first value G1 is strictly greater than 1.5, preferably strictly greater than 1.8.

The first value G1 is, for example, between 0.95 and 1.05.

In the illustrated case, the first value G1 is equal to 1.

The second value G2 is, for example, between 1.95 and 2.05.

In the example described, the second value G2 is equal to 2.

As a variant, the second value G2 is strictly greater than 2.5.

Furthermore, according to one embodiment, the second value G2 is selected by the user of the sight 20.

Thus, for the case of FIG. 2, the ratio between the second value G2 and the first value G1 is equal to 2.

The image sensor 44 is a sensor sensitive to radiation in the visible range.

Additionally, the image sensor 44 is also sensitive to radiation in the infrared range.

The image sensor 44 is a set of pixels. By misnomer, each pixel is termed a "photodetector" in the rest of the description.

For example, the photodetectors are produced in a CMOS type of technology. As a reminder, CMOS refers to an electronic component manufacturing technology and, by extension, the components manufactured using this technology.

According to another example, the image sensor 44 is a charge coupled device (also denoted by the acronym CCD).

In the case described, the camera 30 is capable of operating in the spectral band extending between 400 nanometers (nm) and 1200 nm.

The sensitivity of the camera 30 is between 50 µlux and 50 lux, which defines its dynamics.

Such dynamics make it a level 4 night camera 30.

Such dynamics are achieved by the implementation of an automatic iris and an automatic gain control.

The iris makes it possible to reduce the brightness in the event of too intense illumination.

The automatic gain control makes it possible to electronically adjust the gain of each photodetector of the image sensor 44 and thus to optimize the rendered image.

The control button 32 makes it possible to control the digital magnifier.

The control button 32 is manually operable by the user.

The sensor 34 is a measuring sensor for measuring the illumination of the environment of the sight 20.

The sensor 34 has a large dynamic range. The sensor 34 is capable of measuring illuminations between 10 µlux and 100 lux.

The screen 36 is a display screen of part of the environment.

The screen 36 is a digital screen.

For example, the screen 36 is an OLED type of screen (stands for "Organic Light-Emitting Diode").

In this sense, the screen 36 is an indirect display screen of the environment.

The screen 36 has a brightness.

The brightness is a color property applying to primary sources. More precisely, the brightness assesses the perception of the bright appearance of the studied color: the darker the color is, the less the brightness.

A commonly used definition for brightness was defined by the International Commission on Illumination (CIE) in 1976. This is the definition that is selected for the rest of the description.

In this definition, the brightness is denoted by L* and is calculated from the luminance of the light produced by a primary source (in this case the screen 36) expressed in candelas per square meter with respect to the luminance of white taken as a reference.

The formula for calculation is then given by the following system:

$$L^* = \begin{cases} 116 * \left(\frac{LL}{LL_B}\right)^{\frac{1}{3}} - 16 & \text{if } \frac{LL}{LL_B} > \left(\frac{6}{29}\right)^3 \\ 903.3 * \frac{LL}{LL_B} & \text{if } \frac{LL}{LL_B} \leq \left(\frac{6}{29}\right)^3 \end{cases}$$

Where:
LL designates the luminance of the light produced by the screen 36, and
$LL_B$ designates the luminance of white on the screen 36 taken as a reference.

The camera 30 and the screen 36 are configured so that a user of the sight 20 sights a target with both eyes open.

This notably implies that the image displayed on the screen 36 is an image at "infinity" or collimated.

Furthermore, the optical system 42 is capable of operating at a hyperfocal distance. This means that no focusing adjustment is performed between a minimum distance (a few meters) up to infinity.

For a target sighted over 100 meters or more, the optical system 42 is therefore such that the screen 36 displays an image at "infinity" allowing the user to sight with both eyes open.

Furthermore, the camera 30 and the screen 36 are arranged for minimizing the observation of the protective shell 26 of the sight 20 by the eye looking at the scene to be observed in direct view. This facilitates the superimposition of the images seen by both eyes.

According to a particular embodiment, the screen 36 has a size very close to the protective shell 26.

In the example represented, the display screen 36 is perpendicular to the main direction X. The screen 36 therefore has a height and a depth.

The ratio between the height and the depth is between 1 and 2.

The screen 36 also has a diagonal.

The dimension of the diagonal is between 4 cm and 6 cm.

According to the example provided, the dimension of the diagonal is equal to 5 centimeters.

The screen 36 also has a good quality of reproduction of the image acquired by the camera 30. This means that the dynamics of the screen 36 follow the brightness of the scene observed by the naked eye. Indeed, in order to facilitate image merging, the brightness of the scenes should be very similar. The brain always has a tendency to give priority to the brightest scene.

The support 18 and the screen 36 are arranged in space so that the distance between the user's head and the screen 36 is between 8 centimeters and 15 centimeters when the user's head is supported on the support 18. In such a context, the distance between the user's head and the screen 36 is the distance between the eye sighting the screen 36 and the center of the screen 36. This distance is denoted by d in FIGS. 3 and 4.

The controller 38 is suitable for controlling the brightness of the screen 36 according to the illumination measured by the sensor 34 for measuring the illumination.

Such control is indicated by dashed lines in FIG. 2.

Control is such that the brightness of the screen 36 appears identical to the brightness of the scene observed with the naked eye for the user. One way of achieving such control is for both brightnesses to be identical.

The power supply 40 of the sight 20 is an electrical power supply.

According to one example, the power supply 40 is a cell.

The battery is, in one particular case, an AA cell.

According to another example, the power supply 40 is an accumulator.

According to yet another example, the power supply 40 is a battery.

According to a variant, the power supply 40 is an assembly comprising elements, the elements being selected from a cell, an accumulator and a battery.

The operation of the firearm 10, and, in particular, of the sight 20, is now described with reference to FIGS. 3 and 4, which illustrate two particular configurations of using the sight 20.

As a preliminary remark, it should be noted that the sight 20 can be used for different applications depending on the user's mission. Thus, according to circumstances, the sight 20 serves as equipment for facilitating observation, sighting or firing at one or more predefined targets.

Figure 3:
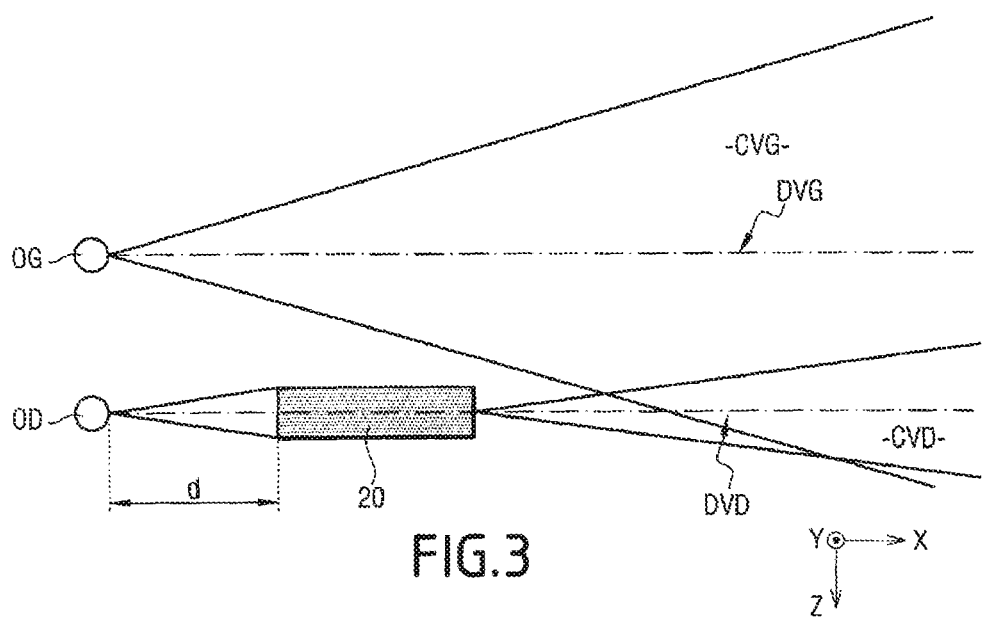
FIG. 3, a diagram illustrating a first example of configuration for using the sight in FIG. 1, FIG. 4, a diagram illustrating a second example of configuration for using the sight in FIG. 1, and FIG. 5, a schematic representation of another example of sight.

In the first configuration illustrated in FIG. 3, the user sees the scene with one eye facing the screen 36 and one eye looking at the scene directly. In the example represented, it is the right eye OD that looks at the screen 36 and the left eye OG that looks at the scene directly.

The left eye OG thus observes a scene at infinity without sighting means with a natural magnification. This natural magnification is usually equal to 1. The field of view of the left eye CVG is bounded by two solid lines in FIG. 3. The direction of sighting of the left eye OG is further indicated, denoted by DVG.

The right eye OD observes the screen 36 that displays the image of a scene at "infinity" with a magnification equal to 1, which is identical to the natural magnification. The field of view of the right eye CVD is bounded by two solid lines in FIG. 3. The direction of sighting of the right eye OD is further indicated, denoted by DVD. The direction of sighting DVD of the right eye OD is parallel to the direction DVG of sighting of the left eye OG.

Then the user's brain merges the direct observation of a scene by the left eye OG with the observation through the screen 36 by the right eye OD.

In this first configuration, the fact is advantageously used that the image displayed on the screen 36 is an image of the scene at "infinity" with a magnification of 1 with good optical quality.

In such a configuration, the presence of an eyepiece is not necessary. However, this implies asymmetrical working on each eye limiting the use of such a configuration because of the risk of headaches caused to the user of the firearm 10.

Figure 4:
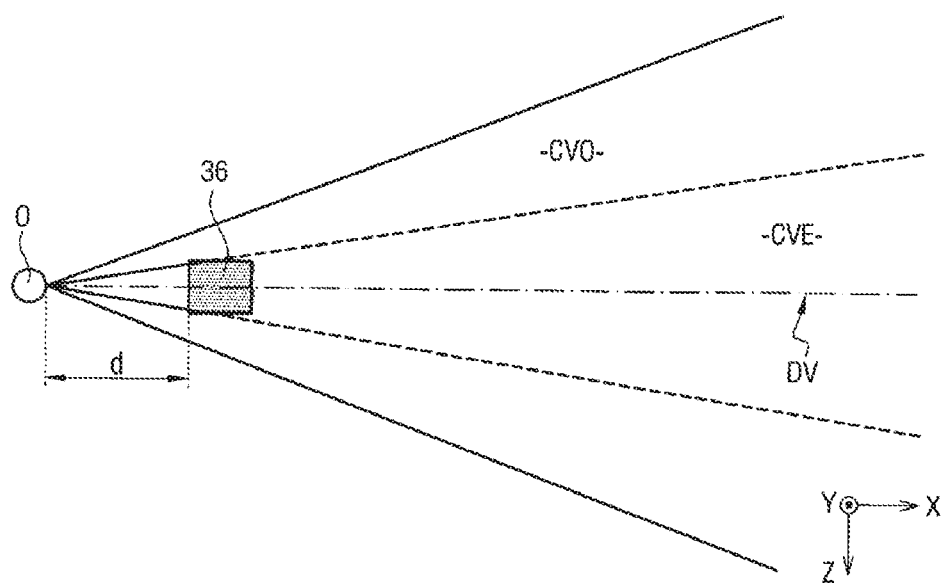

In the second configuration illustrated in FIG. 4, the user sees the scene with their eye O for the part of the field of view, which is not obscured by the screen 36 and sees the other part of the scene by looking at the screen 36. The part of the field of view that is not obscured by the screen 36 is denoted by CVO (visual field seen directly by the eye) and the part of the scene by looking at the screen 36 is denoted by CVE (visual field seen directly by the screen 36). The sighting direction being common to both configurations, the sighting direction is denoted by DV.

The other part of the scene being at "infinity," the user's brain merges the two images.

The second configuration works even if the scene displayed on the screen 36 is with a higher magnification than 1, i.e., with a magnifying effect.

When the distance of the sight 20 is correctly adjusted (distance from eye to sight 20) thus allowing each eye to convey an image consistent with each other in image size, brightness and color the brain merges (superimposes the two images) to give the impression of a single image.

The sight 20 is therefore a day/night sight for urban combat, the main features of which are being a short distance optronic sighting system. The term "short distance" in this context, is understood to mean a sighting distance of less than 200 meters.

Furthermore, the sight 20 is one of indirect view since the screen 36 is used.

The sight 20 is capable of operating without an eyepiece.

The sight 20 allows the user of the firearm 10 to have simultaneous firing and mobility capabilities. These capabilities are accessible to the user of the weapon by day or night.

The sight 20 offers the user the ability to fire with both eyes open.

The sight 20 also allows the user to perceive the environment at a short distance.

The use of the sight 20 allows the user to fire while remaining under cover. This advantage is independent of the illumination conditions so that the user can fire while remaining under cover both day and night.

The sight 20 enables the user to benefit from large dynamics of observation of the environment since the sight 20 is adapted to conditions corresponding to lighting between 10 μlux and 100 lux.

According to the embodiments, the adaptation is implemented automatically or non-automatically.

The sight 20 offers the user great robustness.

The sight 20 also has a small space requirement and low weight, which ensures operational efficiency up to 400 meters.

The sight 20 also provides the user with rapid target acquisition, which may allow the user to save themselves in some cases. Notably, the operation of adjusting fire, i.e., placing the eye in the axis of the sight 20 is avoided. Since this operation is tricky, for sights 20 according to the prior art, the speed of acquisition of the target is much slower.

Furthermore, the sight 20 may be produced at a reduced cost.

Thus, the sight 20 makes the firearm 10 suitable for urban combat regardless of the lighting conditions. As a result, the firearm 10 is usable both by day and by night.

The sight 20 is compatible with night vision goggles.

Other embodiments are also possible for the sight 20.

Figure 5:
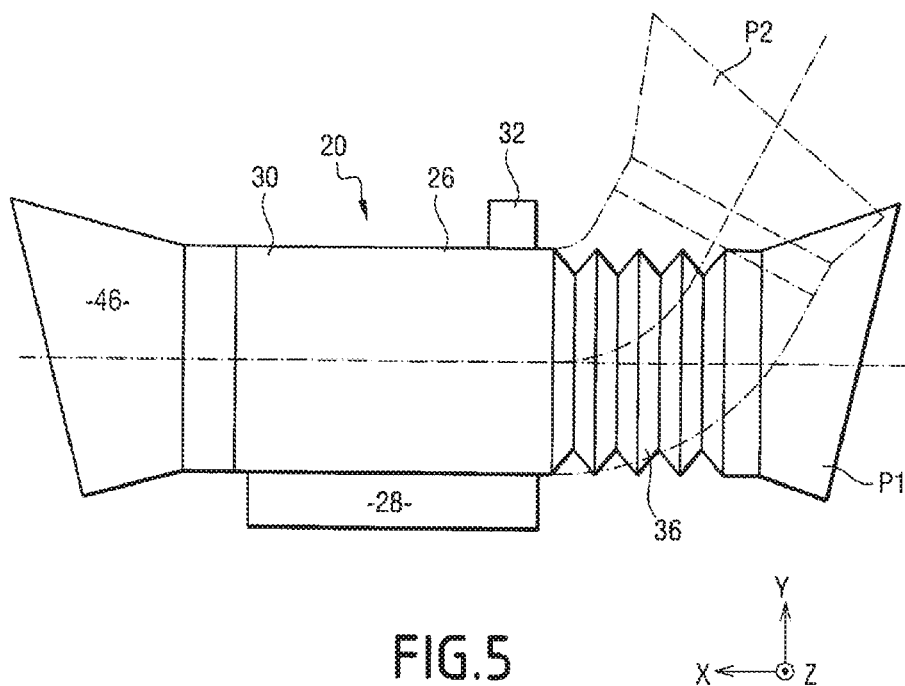

Another embodiment of the sight 20 is shown in FIG. 5.

The sight 20 according to FIG. 2 and the sight 20 according to FIG. 5 being similar, only the differences between the two sights 20 are described in what follows. The valid remarks for both sights 20 are not repeated here for ease of reading.

In the example of FIG. 5, the measuring sensor 34 (FIG. 2) is the image sensor 44 (FIG. 2) of the camera 30.

Furthermore, the screen 36 is adjustable between at least two distinct positions.

For example, the screen 36 is mounted on a ball joint so that the screen 36 is adjustable along all the possible axes.

The screen 36 is further provided with a protective bellows.

FIG. 5 illustrates an observation along the main direction X in a solid line (position P1) and a downward observation for a hip shot in dashed lines (position P2).

It should be noted that the lateral positions offset to the right or the left are also possible for a lateral observation in a firing position concealed behind an obstacle, like a wall.

In such an embodiment, the advantages mentioned for the sight 20 according to the embodiment of FIG. 2 are also valid.

Furthermore, the sight 20 of FIG. 5 is lighter and the sight 20 makes other firing configurations possible, such as firing at the hip from above or laterally for concealed fire. These configurations have operational advantages.

Other variants are also conceivable.

According to another variant, the measuring sensor 34 (FIG. 2) comprises two separate sensors, a first sensor intended for daytime illumination conditions and a second sensor intended for night-time illumination conditions.

Such a variant gains in accuracy at the expense of the weight of the sight 20.

According to one variant, the merging between the two images also makes it possible to transmit information to the user via the screen 36.

When the distance of the sight 20 is correctly adjusted (thus allowing each eye to convey an image consistent with one another in image size, brightness and color) the brain merges (superimposes the two images) to give the impression of a single image on which the information is embedded on the screen 36.

In a specific embodiment, the information is the operating information on the firearm 10.

The information is, for example, sighting information.

As a variant, the information is operating information for the sight 20, such as the battery charge level.

According to an alternative or additional embodiment, the information on the screen 36 is a sight reticle.

For example, the sight reticle is a cross.

According to another example, the sight reticle is a plurality of dots lighting up when the controller 38 (FIG. 2) considers that the adjustment is correct. For this, an automatic assessment is used of the focal length of the optical system 42 (FIG. 2).

In such a variant, the user of the firearm 10 (FIG. 1) has speedy access to the information that the user needs to make their decision. Such speed increases the user's responsiveness to a threat.

Advantageously, the sight reticle is usually displayed in black, creating a contrast with the screen 36.

By definition, subsequently, the reticle/screen 36 contrast is defined as the difference between the luminance of the reference white of the screen 36 and the luminance of the color selected for displaying the sight reticle on the screen 36.

The controller 38 (FIG. 2) is also capable of controlling the reticle/screen 36 contrast according to the illumination measured by the sensor 34.

As a variant, the controller 38 uses a database comprising a set of reticles, each reticle being associated with a set of usage conditions. The controller 38 is then capable of determining the conditions for a given situation and selecting the suitable reticle in the database.

According to a variant, the magnification of the camera 30 is adjustable to exactly match the natural magnification of the user of the firearm 10.

According to another variant, the sight 20 also comprises a light source arranged for using the optical system 42 (FIG. 2) of the camera 30.

For example, the light source is a light-emitting diode capable of emitting in a range of non-visible wavelengths but detectable by the camera 30.

Typically, the range of wavelengths is included in the infrared domain.

For example, depending on the types of observation, the wavelength ranges are one or more of the following: a wavelength range between 400 nm and 600 nm, a wavelength range between 500 nm and 900 nm and a range between 400 nm and 1200 nm, a wavelength range between 2 µm and 5 µm (also known as band 2) and a wavelength range between 8 µm and 12 µm (also known as band 3).

As a variant, the light source is a laser.

The light source allows target designation for an instinctive shot, or the illumination of a scene in case of total darkness (confined area, building, etc.).

According to a particular case, the intensity of the light source is adjustable.

According to another particular case, the sight 20 is provided with a diffuser the position of which is adjustable, the diffuser being on the path of the light source in the case where it is desired to designate the target.

In this variant, the fact that the sight 20 has a wider bandwidth than all the night vision systems conventionally deployed on the battlefield is advantageously used for providing the sight 20 with an additional function of target designation or of illumination of an environment.

According to another variant, the screen 36 comprises multiple operating modes.

For example, according to a particular case, the screen 36 comprises a mode termed "night vision through goggles" wherein the screen 36 displays a residual brightness to enable the use of night vision goggles. The residual brightness is the brightness that would be observed with the naked eye by a user equipped with night vision goggles.

In one particular case, the transition into the mode termed "night vision" is performed with the aid of an addition of an attenuating filter.

For example, the position of the attenuating filter is controllable by the control button 32.

Such an operating mode allows the use of the firearm 10 with night vision goggles.

Using a mode termed "night vision through goggles" adapting the brightness of the screen 36 to the sensitivity of the goggles thus allows the superimposition of the view of the observed scene through goggles and the image displayed by the screen 36. The experiments conducted by the applicant have shown that the sight 20 could be used with an efficiency of over 100 meters against 25 meters for a sight 20 of the prior art. Furthermore, for the user, the ease of acquisition is much superior with the sight 20 as described.

According to another particular case, the sight 20 has a "direct view" mode and a "through-screen view" mode.

For this, the sight 20 is provided with a direct optical view.

The direct optical view would give access to the same scene as the screen 36.

Switching between direct optical view and view via the screen 36 is controlled by a dedicated mechanism.

The mechanism comprises, for example, prisms or reflecting strips.

In a particular example, the switching of the mechanism is controlled from outside by the user.

According to another particular example, the switching of the mechanism is controlled by the controller 38 (FIG. 2) and thus by the ambient lighting conditions.

The advantage of such a sight 20 lies in benefiting from the best of the two views (direct and indirect) and notably increasing the autonomy of operation.

As a variant, the optical system 42 (FIG. 2) comprises a mechanical and non-digital magnifier.

For example, the optical system 42 is provided with a retractable magnifying lens having at least two positions, each position corresponding to a different magnification of the system.

For example, in the first position, the magnifying lens makes it possible to obtain a first magnification G1 in the first position and the magnifying lens makes it possible to obtain a second magnification G2 in the second position.

The present disclosure corresponds to all technically possible combinations of the previously described embodiments.

The invention claimed is:

1. A sight for use by day and at night, the sight comprising:
    an attachment interface for attachment to a firearm;
    a camera for acquiring a part of a scene for sighting a target in the scene, the camera comprising an image sensor;
    a measuring sensor for measuring illumination of the scene that includes the target, the measuring sensor being the image sensor of the camera;
    a screen for digitally displaying the part of the scene acquired by the camera, the screen having a brightness, the screen providing a majority of a front surface of the sight;
    a controller for controlling the brightness of the screen according to the measured illumination measured by the image sensor; and
    a shell protecting the camera, the measuring sensor, the screen, and the controller,
    the camera and the screen configured so that a user of the sight sights the target in the scene with both eyes open, with a first eye viewing the screen digitally displaying the part of the scene acquired by the camera while a second eye directly views the scene,
    the camera having an operating mode wherein a magnification is between 0.95 and 1.05, and
    the controller configured to automatically adjust the brightness of the screen to be identical to a brightness of the part of the scene acquired by the camera so that the part of the scene displayed on the screen and viewed by the first eye and the scene directly viewed by the second eye are merged in the user's brain.

2. The sight of claim 1, wherein the screen has a diagonal, the dimension of which is between 4 centimeters and 6 centimeters.

3. The sight of claim 1, wherein the controller is further configured to display a sight reticle on the screen and to control a contrast between the sight reticle and the screen according to the measured illumination.

4. The sight of claim 1, further comprising a control button for changing the operating mode of the camera between a first operating mode and a second operating mode, the first operating mode being the operating mode wherein the magnification of the camera is between the 0.95 and the 1.05, and the second operating mode being wherein the magnification of the camera is between 1.95 and 2.05.

5. The sight of claim 1, wherein the screen is adjustable between at least two distinct positions.

6. The sight of claim 1, further comprising a direct optical view, switching between a view with the screen and the direct optical view being controlled by the controller according to the measured illumination.

7. The sight of claim 1, wherein:
    the camera and the screen are configured so that, when the second eye directly views the scene, the second eye's view is unobscured by the sight.

8. The sight of claim 1, wherein the sight is configured to display the part of the scene as a collimated image.

9. A firearm comprising a sight for use by day and at night, the sight comprising:
    an attachment interface for attachment to a firearm;
    a camera for acquiring a part of a scene for sighting a target in the scene, the camera comprising an image sensor;
    a measuring sensor for measuring illumination of the scene that includes the target, the measuring sensor being the image sensor of the camera;
    a screen for digitally displaying the part of the scene acquired by the camera, the screen having a brightness, the screen occupying a majority of a front surface of the sight;
    a controller for controlling the brightness of the screen according to the measured illumination measured by the image sensor;
    a shell protecting the camera, the measuring sensor, the screen, and the controller; and
    a support for a user's head, the support being arranged so that a distance between the user's head and the screen is between 8 centimeters and 15 centimeters when the user's head is resting on the support,
    the camera and the screen configured so that a user of the sight sights the target in the scene with both eyes open, with a first eye viewing the screen digitally displaying the part of the scene acquired by the camera while a second eye directly views the scene,
    the camera having an operating mode wherein a magnification is between 0.95 and 1.05, and
    the controller configured to automatically adjust the brightness of the screen to be identical to a brightness of the part of the scene acquired by the camera so that the part of the scene displayed on the screen and viewed by the first eye and the scene directly viewed by the second eye are merged in the user's brain.

10. The firearm of claim 9, wherein:
    the camera and the screen are configured so that, when the second eye directly views the scene, the second eye's view is unobscured by the sight.

11. The firearm of claim 9, wherein the sight is configured to display the part of the scene as an image at infinity.

* * * * *